W. C. BRUSON.
Anti-Freezing Fire-Extinguishers.

No. 143,746.  Patented Oct. 21, 1873.

Witnesses.  Inventor.
G. L. Chapin  Willard C. Bruson
E. J. Chapin

UNITED STATES PATENT OFFICE.

WILLARD C. BRUSON, OF CHICAGO, ILLINOIS.

IMPROVEMENT IN ANTI-FREEZING FIRE-EXTINGUISHERS.

Specification forming part of Letters Patent No. 143,746, dated October 21, 1873; application filed January 30, 1873.

*To all whom it may concern:*

Be it known that I, WILLARD C. BRUSON, of Chicago, in the county of Cook and State of Illinois, have invented a new and useful Improvement in Anti-Freezing Fire-Extinguishers, of which the following is a specification:

My invention consists, first, in the method of construction of the case and tank, and the use of non-conducting substances to protect the contents from freezing; second, in the use of two chargers to contain liquid chemicals; third, in the relative arrangement of said chargers; fourth, in protecting the surface exposed to the action of water with a coating of paraffine.

Figure 1:
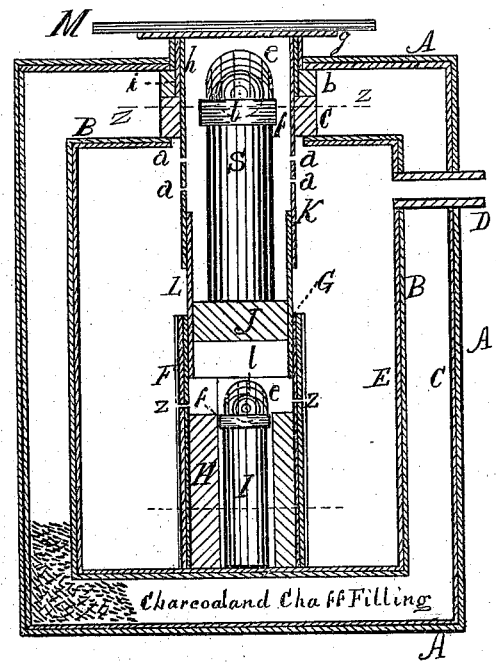
Figure 3:
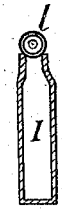
Figure 2:
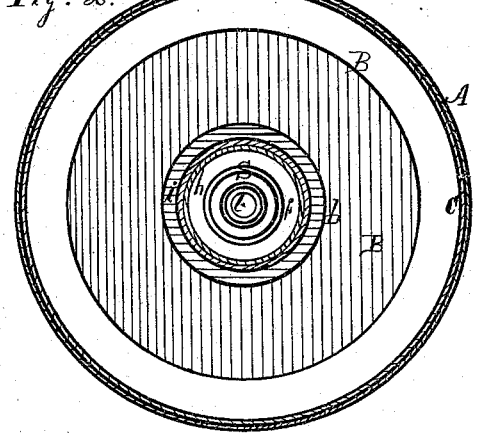

In the drawings, Figure 1 is a sectional elevation of my improved anti-freezing fire-extinguisher; Fig. 2, a section thereof taken on line $z\ z$; Fig. 3, a sectional elevation of one of the chargers with wire gauze or netting removed.

A represents the outside case, which is made of metal or any suitable material, and any desired size. The inside of this case is coated with hot paraffine wax, as shown at C, and the space between it and the tank E is filled with any suitable non-conducting material or materials for cheapness, such as powdered charcoal, or chaff, or both combined. Other substances, however, such as wool, hair, fur, cork, straw, paper, sawdust, or tan-bark, can be used with good results to prevent the penetration of heat or cold; or the space may be filled with anti-freezing liquids, such as alcohol, naphtha, ether, concentrated liquid ammonia, linseed-oil, kerosene-oil, separate or in combination. The internal and external surfaces of tank E are coated with hot paraffine wax, and in cold climates an additional coating of felt or any suitable non-conducting material is put on the exterior of the tank, and such a coating may be put on the inside of the case. India-rubber or gutta-percha, either separate or combined, may be used with the paraffine wax. The case which supports the lower charger I is coated with paraffine wax G, and lined with cork H, or other suitable non-conducting substance, as a protection against frost. The upper case L $h$, supporting the charger S, extends into case F, and it is insulated from the case A by a non-conducting lining, $i$, Fig. 1, and it is protected on its periphery by cork $b\ c$, or other suitable non-conducting substance. It may be coated with wax, or may be covered with felt in cold climates as a further protection. The chargers S I are provided with ball-stoppers $l$, and the balls are held in place by wire netting $e$, secured to the chargers by bands $f$, or other suitable fastening. This arrangement allows the chargers to empty their contents automatically into tank E when the apparatus is inverted, and the balls to fall back to the proper place when the chargers are upright.

The chargers are to be filled with such chemicals as will generate the fire-extinguishing gas when they come in contact with each other and mingle in the tank E, and produce such pressure as will force the liquid out at pipe D, which is to be provided with a cock to retain the contents of the tank when not in use. The chargers may contain, the one an acid and the other an alkaline solution, and are filled by removing the cases L $h$ F by means of a lever, M, the case L $h$ in practice being turned into case A by a screw-thread.

These extinguishers are generally made portable, and the drawing represents one of that kind, and it is provided with the usual openings $a\ z$ for the contents of chargers to enter the tank E. The importance of this general construction will be understood when it is known that all of the principal extinguishers freeze up in cold weather and are then useless.

I claim—

1. In combination, the cases A L $h$ F and tank E of a fire-extinguisher, with the interposed non-conducting packing, as set forth.

2. The combination and arrangement of the two chargers I and S within the same case E of a fire-extinguisher.

3. The chargers I and S, arranged one above the other, with a packing, J, of non-conducting material between them.

4. The case L $h$ F, constructed with two parts to contain the two chargers I and S, and made detachable from the case A, as and for the purpose set forth.

WILLARD C. BRUSON.

Witnesses:
G. L. CHAPIN,
E. J. CHAPIN.